United States Patent
Lochridge, Jr.

[11] 3,644,725
[45] Feb. 22, 1972

[54] LIGHT DISPLAY APPARATUS

[72] Inventor: Robert L. Lochridge, Jr., 460 California Avenue, Palo Alto, Calif. 94306

[22] Filed: Sept. 11, 1969

[21] Appl. No.: 857,008

[52] U.S. Cl. ........................................240/1, 240/10.6 R
[51] Int. Cl. ...........................................F21l 11/00
[58] Field of Search......................240/1, 2, 2.2, 10, 63, 52.5, 240/1 EI; 46/228

[56] References Cited

UNITED STATES PATENTS

| | | | |
|---|---|---|---|
| 233,039 | 10/1880 | Smith | 240/1 |
| 2,574,621 | 11/1951 | Chun | 240/2 |
| 2,760,185 | 8/1956 | Held | 240/1 |
| 3,325,940 | 6/1967 | Davis | 46/228 |
| 3,383,675 | 5/1968 | Allardice et al. | 240/10.63 X |

FOREIGN PATENTS OR APPLICATIONS

| | | | |
|---|---|---|---|
| 832,456 | 2/1952 | Germany | 240/1 |

Primary Examiner—Louis R. Prince
Assistant Examiner—William A. Henry, II
Attorney—Lowhurst & Hamrick

[57] ABSTRACT

Light display apparatus including a plurality of flexible elongated members joined at one end to a handle means and having at their other ends means for creating brilliant spots of light so that by imparting motion to the handle means the light spots are caused to move more or less randomly in space as the elongated members flex. Such apparatus may be used to produce an interesting light effect as the illuminated ends variously oscillate in space in a darkened environment.

3 Claims, 5 Drawing Figures

PATENTED FEB 22 1972
3,644,725
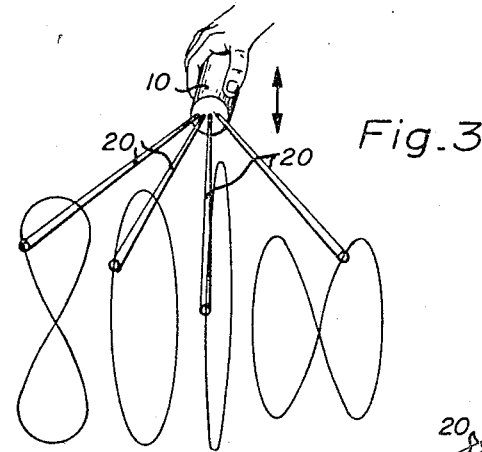
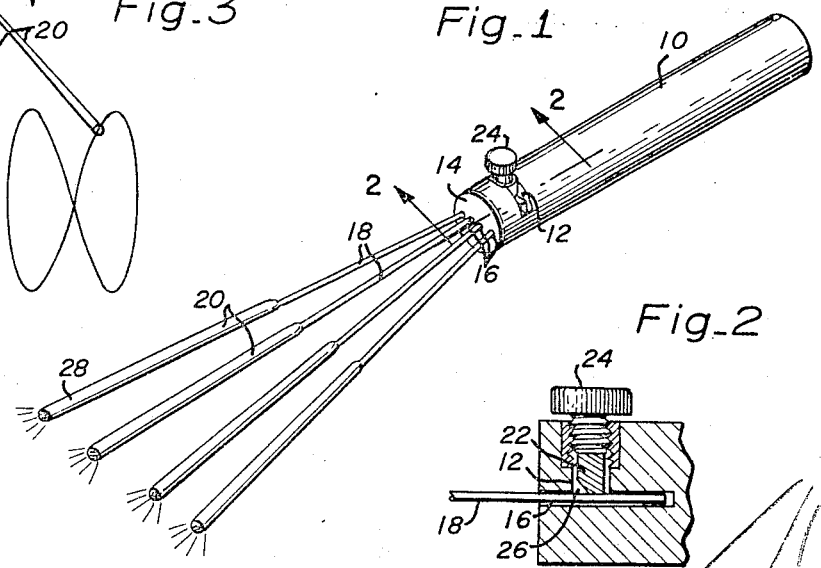
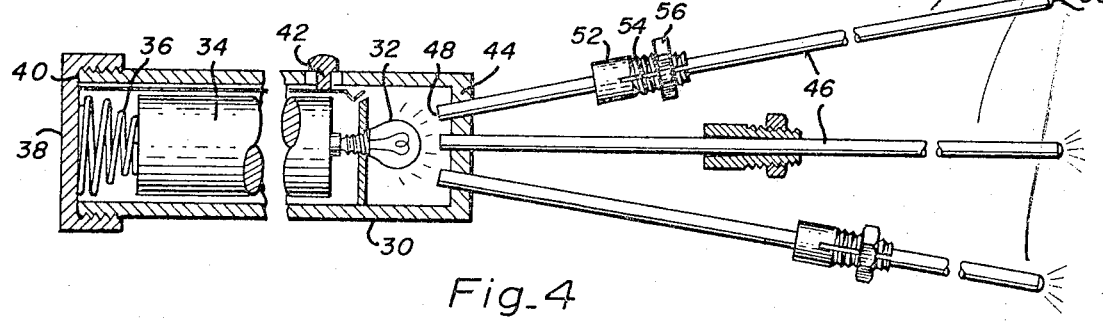
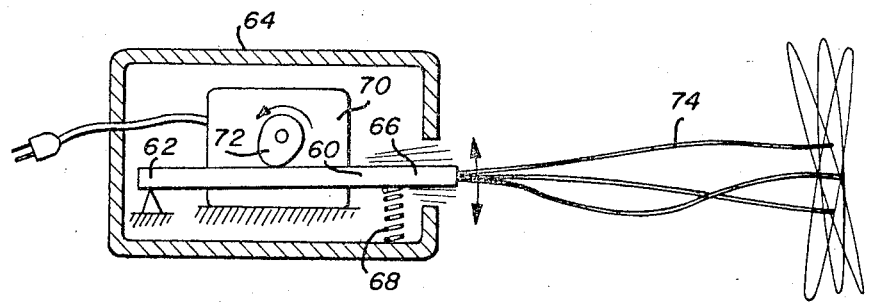
INVENTOR
ROBERT L. LOCHRIDGE, JR.

3,644,725

LIGHT DISPLAY APPARATUS

BACKGROUND OF THE INVENTION

The present invention relates generally to amusement devices and, more particularly, to a novel means for providing a continuously changing light display means which can be used to produce interesting, dynamic visual displays.

Heretofore, many types of luminous devices have been provided for producing intriguing and interesting effects in darkened environments. In fact, many commercial sign displays depend primarily on the visual sensation created by moving lights to catch the attention of prospective viewers. As another example, it is interesting to observe the dynamic light effect that can be created on the face of an oscilloscope when it is energized to produce phase varying lisajous figures or the like. Moreover, nearly everyone has been dazzled by the effect created by a dancer carrying one or more flaming objects or other sources of light on a darkened stage.

OBJECTS OF THE PRESENT INVENTION

It is therefore a primary object of the present invention to provide a novel means for creating interesting moving light effects for use in a darkened or semidarkened environment.

Another object of the present invention is to produce a means for providing psychedelic light displays.

Still another object of the present invention is to provide a dynamic light source means for catching and retaining the attention of a viewer in a darkened environment.

Still another object of the present invention is to provide a hand-held plural light source means which upon being manually oscillated will produce a plurality of independently varying luminous phenomena.

SUMMARY OF THE PRESENT INVENTION

In accordance with one embodiment of the present invention, a plurality of flexible elongated members are joined at one end to a handle means and have at their other ends means for creating brilliant spots of light. By shaking the handle means the light spots are cause to move more or less randomly as the elongated members flex producing an interesting light effect as the illuminated ends variously oscillate in space. Such a device can be utilized in a darkened environment to produce a near hypnotic effect which can be the subject of amusement or hypnotic experimentation.

In accordance with a second preferred embodiment, an electrified device is provided wherein an electromechanical means is used to cause the flexible light source means to be continuously oscillated in space.

The many applications and utilities of the present invention will become apparent to the reader after having read the following detailed description of the preferred embodiments which make reference to the several figures of the drawing.

IN THE DRAWING

FIG. 1 is a simplified illustration of a hand-held embodiment of the present invention.

FIG. 2 is a partial section taken along the line 2—2 of the embodiment illustrated in FIG. 1.

FIG. 3 illustrates some of the various luminous effects which can be created using the present invention.

FIG. 4 is a more sophisticated electrically luminated embodiment of the present invention.

FIG. 5 is a motorized embodiment of the present invention.

DETAILED DESCRIPTION OF THE PRESENT INVENTION

Turning now to FIG. 1 of the drawing, there is shown a simplified embodiment of the present invention which includes an elongated handle member 10 having a transverse slot 12 cut approximately half way therethrough proximate the end 14. Four bores 16 extend into the handle member 10 through the end 14 a distance of at least one inch. The bores 16 converge toward the longitudinal axis of the handle member 10 so that when the stems 18 of the illuminating members 20 are extended thereinto, the members 20 will be positioned in a fan array as indicated in FIG. 1. The stems 18 are held within the bores 16 by a suitable clamping means such as is indicated in FIG. 2.

The clamping means includes a bar 22 which is positioned in the transverse handle slot 12 over the ends of the stems 18. The bar 22 is driven into clamping engagement with the stems 18 by a suitable thumb screw means 24 which is threadably received within the groove 12. In order to insert the stems 18 into the bores 16, the thumb screw 24 is rotated counterclockwise so as to release the pressure applied to the bar 22. The stems are then inserted into the bores 16 and engage the bevelled face 26 of the bar 22 causing it to ride up over the ends of the stems 18 and allow them to pass into the bores 16 beyond the clamping means. The thumb screw 24 is then rotated clockwise to clamp the stems 18 firmly in place.

The members 20 are comprised of suitable light source means which, as illustrated, are in the form of wooden stems 18 having a deposit of some slow burning or glowing material 28 deposited on the ends thereof so that when the tips thereof are lit glowing sources of light are produced as the material burns back along the members 20. The members 20 may take the form of simple fireworks lighting sticks or may be incense sticks which while burning emit a pleasant odor of incense. Moreover, simple sparklers may be utilized to produce an interesting effect.

In operation and after insertion of the members 20 into the handle 10, the ends 28 are lit and the handle 10 is held in the hand of the user. By causing the device to be oscillated in a darkened room an interesting light display can be created as each of the members 20 seeks to flexibly follow the movement of the handle 10. An example of the luminous effect which can be created by a simple up and down movement of the handle 10 is illustrated in FIG. 3 wherein it is seen that each of the members 20 oscillate freely and independently of each other to produce varying light displays as the glowing ends thereof are forced into an oscillating motion in response to the reciprocal movement of the handle 10. The effects which can be created with such a device are many and varied and will be determined by the length and flexibility of the members 20, the respective weights thereof and the manner in which the handle 10 is moved.

Turning now to FIG. 4 of the drawing, an alternative embodiment of the invention is illustrated. The device includes a handle means 30 which is hollowed out to receive a lamp means 32 and a plurality of penlight batteries 34 which are biased into engagement with the lamp 32 by a spring means 36. The batteries 34 may be inserted into the member 30 by removing the cap 38 which is threadably received upon the open end 40 of the member 30. Suitable switch means 42 of the type used in the typical flashlight are provided for turning on and off the lamp 32.

Extending into the end 44 of the member 30 are a plurality of flexible light pipes 46 which are coated with an opaque material over their entire outer surface except at the ends 48 and 50. Thus, light which emanates from the lamp 32 and passes into the ends 48 will be conducted along the light pipes 46 to the opposite ends 50 whereby it will produce sources of illumination which are analogous to the effect created by the glowing ends of the conflagrant members 20 shown in FIG. 1.

The light pipes 46 may be made of any suitable light conducting means which is flexible enough to produce the desired oscillating effect as the handle member 30 is moved back and forth. As an alternative to this embodiment the light pipes 46 may be replaced with flexible members having lamps mounted at the remote ends 50 which are illuminated by the batteries 34 via electrical conductors which extend either internal or external of the flexible members. The electrical connectors would be suitably coupled to the batteries 34 in place of the lamp 32.

As an additional feature of this embodiment, a weight means 52 may be provided on each of the light pipes 46 which can be selectively positioned along the pipes 46 at any desired position and then fastened at that position to alter the vibratory characteristics of the respective light pipes. A simplified form of such a device may take the form of a threaded sleeve having longitudinal slots 54 cut therealong with a nut 56 threaded thereover so as to cause the member 52 to clampingly engage the pipe 46 as the nut 56 is threaded onto the member 52.

It will be readily understood by those skilled in the art that by variously positioning these weighted members along the pipes 46 the vibratory characteristics of the members 46 will be markedly altered and consequently will enable each light pipe to trace a unique light pattern as the device is manipulated.

By either using different colored tips at the ends 50 or different colored light pipe materials another variation in the effect created by the device can be produced. Furthermore, the tip sizes may be varied to produce other interesting effects as well.

Turning now to FIG. 5 of the drawing, another embodiment of the present invention is illustrated. In this embodiment the handle means 60 is pivotally attached at the end 62 within a suitable housing 64 and the other end 56 of the handle 60 is biased upwardly by a suitable resilient means 68. An electrical motor means 70 is provided for driving a cam means 72 which engages the top of the handle 60 so as to produce a periodic oscillation of the handle 60 about the pivot point 62. This periodic oscillation causes the ends of the illuminating members 74 to whip about in space and produce a light display similar to those created by the above described embodiments.

The members 74 may be either the burning ember type illuminators illustrated in FIG. 1 or may be of the electrical variety illustrated in FIG. 4 in which case an electrical source of illumination would be provided in the handle member 60. In addition to the up and down impetus supplied to the handle 60 by the cam 72 means may be provided for simultaneously imparting lateral motion to the handle 60 giving rise to a lateral component of motion at the illuminated ends of the members 74.

The various uses of the present invention as a means of providing eye catching, luminous displays are many and varied and will range from a means for producing a psychedelic light show to a means for producing a serious decorative light display. Although the embodiments illustrated are, for purposes of simplicity, shown to have all of the flexible light producing media arrayed in a single plane, it will be understood that the flexible members can just as well be arrayed in any suitable manner. For example, it may be desirable to array the flexible light sources in a circular or spiral configuration to produce a given effect. For example, if a plurality of flexible members are spirally arrayed in the end of an elongated handle member and the handle is twisted about its axis first in one direction and then in the other, an interesting opening and closing spiral display can be created.

The numerous methods of use and the plurality of forms in which the invention may be embodied being so numerous it is to be understood that this description of preferred embodiments is for purposes of illustration only and is in no manner intended to be limiting in any way. Accordingly, I intend that the appended claims be interpreted as covering all modifications which fall within the true spirit and scope of my invention.

What is claimed is:

1. Light display apparatus, comprising:
   handle means;
   at least one resilient elongated member having one end thereof fixedly engaging said handle means and means at the other end thereof providing an illuminating head, the resiliency of said elongated member being such that motion imparted to said one end causes said illuminating head to oscillate in a generally transverse direction with respect to the longitudinal axis of said elongated member; and
   means selectively positionable along the length of said elongated member to alter the oscillatory characteristics thereof.

2. Light display apparatus as recited in claim 1 wherein said handle means contains a light source and said elongated members includes a light pipe for transmitting light from said light source to said illuminating head.

3. Light display apparatus as recited in claim 1 wherein said handle means further includes a mechanical driving apparatus for imparting motion to said elongated member.

* * * * *